BEST AVAILABLE COPY

UNITED STATES PATENT OFFICE.

ANDREW O'NEILL, OF ANSONIA, CONN., ASSIGNOR TO SAMUEL A. COTTER.

IMPROVEMENT IN MODES OF PREPARING SHEET-COPPER FOR BOILERS AND OTHER VESSELS.

Specification forming part of Letters Patent No. 88,660, dated April 6, 1869; Reissue No. 7,913, dated October 16, 1877; application filed July 23, 1877.

*To all whom it may concern:*

Be it known that I, ANDREW O'NEILL, formerly of Portsmouth, in the State of Ohio, now of Ansonia, in the State of Connecticut, have invented an Improvement in Preparing Sheet-Copper for Boilers and other Vessels, of which the following is a specification:

Sheets of copper have been tinned on one side, and in some instances the sheet had been passed through rollers before my invention; but, in consequence of the acids employed in preparing the sheet for tinning, and the heat used in the tinning operation, the untinned copper surface became dark and irregular in color, and of an objectionable mottled appearance. Besides this, the tin was not uniform in thickness, and was liable to wear off in lines and spots.

The object of my invention is to render the sheet sufficiently hard and springy for the market, and at the same time develop the natural color of the copper surface, and render both the copper and tin surfaces hard and smooth, so that the sheet metal is in a condition for being made up into boilers and other vessels. The sheet-copper in this condition is a new article of manufacture, and the method pursued in producing the same is also novel.

The sheet of rolled copper is cleaned upon one surface, and tinned in any known or desired manner. After this has been done the copper surface is discolored and objectionable in appearance, so that tinned sheet-copper in this condition is not adapted to the market for the manufacture of boilers and other vessels. The sheet is too soft and porous, and often the tinning extends over the edges of the sheet upon the copper surface.

To render the sheet-copper of a handsome color and a more merchantable appearance, and of superior stiffness and elasticity, so that it is less liable to dent or bruise than heretofore, I employ two operations. One is the planishing or consolidating of the sheet, for which highly-polished chilled or steel rollers may be used. By this operation the copper is rendered dense or hard, and the coating of tin is smoothed and unified. The other is a cleaning or polishing operation to remove the discoloration, scale, or foreign substance from the copper surface of the sheet. This is done by a rotary polishing-wheel or buffer, or by any other approved or preferable mode.

The copper thus produced presents a clean, bright surface of copper on one side and a uniform surface of tin on the other side, and the sheet is hard and dense.

In order to prevent atmospheric action on the surface of the copper, it is preferable to employ a dammar varnish, thinned out with turpentine and alcohol, in about equal proportions, and mixed with about the same quantity of dammar varnish, and this is applied to the copper side of the sheet, when it has been warmed upon a steam-table or otherwise. This varnish dries rapidly, and the sheet metal is ready for the market.

I claim as my invention—

1. As a new article of manufacture, the tinned sheet-copper herein described, the same having a bright or polished copper surface, and the whole being cold-rolled, as and for the purposes described.

2. The improvement in the manufacture of tinned sheet-copper, consisting in tinning one surface, cleaning or brightening the other surface, and subjecting the sheet, while cold, to pressure between rollers, substantially as set forth.

3. The sheet of tinned copper prepared by cleaning and rolling, and protected by a varnish upon the copper surface, as and for the purposes set forth.

Signed by me this 20th day of July, A. D. 1877.

ANDREW O'NEILL.

Witnesses:
A. A. COWLES,
A. S. TERRY.